United States Patent
Zarantonello

(10) Patent No.: US 10,337,668 B2
(45) Date of Patent: Jul. 2, 2019

(54) MOUNTING BRACKET AND METHOD OF USE

(71) Applicant: Mark S. Zarantonello, Kansas City, MO (US)

(72) Inventor: Mark S. Zarantonello, Kansas City, MO (US)

( * ) Notice: Subject to any disclaimer, the term of this patent is extended or adjusted under 35 U.S.C. 154(b) by 0 days.

(21) Appl. No.: 15/783,869

(22) Filed: Oct. 13, 2017

(65) Prior Publication Data

US 2018/0106421 A1    Apr. 19, 2018

Related U.S. Application Data

(60) Provisional application No. 62/496,342, filed on Oct. 15, 2016.

(51) Int. Cl.
| | |
|---|---|
| *F16M 13/02* | (2006.01) |
| *E06C 7/00* | (2006.01) |
| *E06C 7/06* | (2006.01) |
| *E06C 7/50* | (2006.01) |

(52) U.S. Cl.
CPC .............. *F16M 13/02* (2013.01); *E06C 7/00* (2013.01); *E06C 7/06* (2013.01); *E06C 7/505* (2013.01)

(58) Field of Classification Search
CPC ... E06C 7/00; E06C 7/06; E06C 7/082; E06C 7/083; E06C 5/32; F16M 13/02; F16M 11/10; F21Y 2115/10; Y10T 29/49826; G06F 1/187
USPC .................................................. 248/210, 211
See application file for complete search history.

(56) References Cited

U.S. PATENT DOCUMENTS

| | | | | | |
|---|---|---|---|---|---|
| 394,792 | A | * | 12/1888 | Shoe ..................... | A47G 25/10 248/304 |
| 647,945 | A | * | 4/1900 | Cope ........................ | F16L 3/13 248/246 |
| D50,217 | S | * | 1/1917 | Fawcett ........................ | D6/323 |
| 1,358,322 | A | * | 11/1920 | McIntosh ........... | A47G 29/1216 232/39 |
| 1,778,771 | A | * | 10/1930 | Pritchard .................. | B60R 9/02 16/DIG. 15 |
| 2,228,593 | A | * | 1/1941 | Dibble ...................... | B60R 9/02 224/42.31 |
| 2,441,051 | A | * | 5/1948 | Wilhelm ............... | A47L 13/512 131/257 |
| 3,288,304 | A | * | 11/1966 | Graves ................. | A47B 81/005 211/64 |
| D218,616 | S | * | 9/1970 | Owen, Jr. ....................... | 211/74 |
| 3,982,719 | A | * | 9/1976 | Kilborne .................. | A47G 1/20 248/489 |
| 4,176,580 | A | * | 12/1979 | Gallegos .................. | G10G 5/00 248/224.51 |

(Continued)

*Primary Examiner* — Katharine W Mitchell
*Assistant Examiner* — Shiref M Mekhaeil
(74) *Attorney, Agent, or Firm* — Law Office of Mark Brown, LLC; Christopher M. DeBacker

(57) ABSTRACT

A mounting bracket for storing large items, such as ladders, off of the ground and on a wall structure. The bracket can store up to three ladders or similar items using a pair of mounting prongs forming a Y-bracket, and a pair of mounting hooks which can receive bungee cords for stretching and connecting around ladder rungs. The bracket can mount to a wall structure by inserting mounting screws through a pair of mounting holes and drilling the mounting screws into the wall or a wall stud.

7 Claims, 8 Drawing Sheets

(56) References Cited

U.S. PATENT DOCUMENTS

| | | | | |
|---|---|---|---|---|
| 4,225,106 A * | 9/1980 | Eplan | A45D 20/12 | 219/242 |
| 4,330,065 A * | 5/1982 | Haddad | B63B 35/85 | 211/70.5 |
| 4,696,405 A * | 9/1987 | Waring | F41A 23/18 | 16/360 |
| 5,121,844 A * | 6/1992 | Ball | A47B 61/02 | 211/105.3 |
| D329,349 S * | 9/1992 | Moreno | D6/567 | |
| 5,145,122 A * | 9/1992 | Poister | B65H 75/06 | 24/129 R |
| 5,307,944 A * | 5/1994 | Reedy | A47B 81/005 | 211/106 |
| 5,320,363 A * | 6/1994 | Burnham | E21B 11/005 | 294/50.8 |
| 5,372,346 A * | 12/1994 | Upchurch | F16B 21/04 | 248/222.52 |
| 5,388,738 A * | 2/1995 | Russell | B60R 9/02 | 224/482 |
| 5,538,144 A * | 7/1996 | Reed | A47F 7/06 | 211/32 |
| 5,704,496 A * | 1/1998 | Latta | B25H 3/04 | 211/70.6 |
| 5,906,304 A * | 5/1999 | Baldacchino | B63B 35/7946 | 224/401 |
| 5,947,432 A * | 9/1999 | Reddin | A45D 20/12 | 248/206.4 |
| 6,121,527 A * | 9/2000 | Hamm | G10G 5/00 | 84/327 |
| 6,189,753 B1 * | 2/2001 | Kalhok | B63B 25/28 | 114/343 |
| 6,302,365 B1 * | 10/2001 | Catanzarite | A47G 25/0614 | 248/215 |
| 6,315,121 B1 * | 11/2001 | Hansen | B25H 3/04 | 206/376 |
| 6,439,404 B1 * | 8/2002 | Steeg | A47F 5/08 | 211/55 |
| 6,533,069 B1 * | 3/2003 | Couillard | E06C 1/34 | 182/107 |
| D494,049 S * | 8/2004 | Ziaylek | D8/373 | |
| 6,811,065 B1 * | 11/2004 | Brady | B60R 7/08 | 224/311 |
| 6,863,199 B2 * | 3/2005 | Child | B62J 11/00 | 224/408 |
| 6,932,224 B1 * | 8/2005 | Sandberg | A47B 81/005 | 211/70.8 |
| 7,419,129 B2 * | 9/2008 | Kixmoeller | A47J 47/16 | 248/316.4 |
| D618,987 S * | 7/2010 | Ziaylek | D8/373 | |
| 7,841,496 B1 * | 11/2010 | Schweikert | F41C 33/002 | 224/150 |
| 7,950,532 B2 * | 5/2011 | Ziaylek | B60R 7/10 | 211/30 |
| D666,081 S * | 8/2012 | Barry | D8/367 | |
| 8,596,590 B2 * | 12/2013 | McCoy | F16L 3/223 | 211/193 |
| 8,678,983 B1 * | 3/2014 | Brown | A63B 21/4033 | 482/131 |
| 8,998,007 B1 * | 4/2015 | Grossmann | A47B 81/005 | 211/85.7 |
| 9,149,134 B2 * | 10/2015 | Diwan | A47F 7/0021 | |
| 9,156,393 B2 * | 10/2015 | Sprang, Jr. | B60P 7/0823 | |
| 9,644,788 B1 * | 5/2017 | Mariner, Jr. | F16M 13/02 | |
| 9,709,192 B1 * | 7/2017 | Newcomb | F16B 19/00 | |
| 2001/0003331 A1 * | 6/2001 | Heneveld | A47B 81/005 | 211/70.6 |
| 2005/0158161 A1 * | 7/2005 | Shubert | B60P 3/125 | 414/563 |
| 2006/0091165 A1 * | 5/2006 | Swanson | A47F 7/06 | 223/85 |
| 2006/0261227 A1 * | 11/2006 | Petrick | F16M 11/10 | 248/276.1 |
| 2007/0108357 A1 * | 5/2007 | Plowman | F16B 45/00 | 248/304 |
| 2007/0144505 A1 * | 6/2007 | McCallister | A63B 21/0552 | 124/20.1 |
| 2007/0205335 A1 * | 9/2007 | Huebner | F16L 3/133 | 248/58 |
| 2008/0079277 A1 * | 4/2008 | Wethington | B60P 3/40 | 296/3 |
| 2010/0123064 A1 * | 5/2010 | Ziaylek | B60R 7/10 | 248/274.1 |
| 2010/0213346 A1 * | 8/2010 | Chen | A47F 5/0006 | 248/693 |
| 2010/0270246 A1 * | 10/2010 | Rodriguez | A47B 96/16 | 211/34 |
| 2011/0147424 A1 * | 6/2011 | Brown | B60N 3/103 | 224/441 |
| 2012/0074277 A1 * | 3/2012 | Krumpe | A47G 25/0607 | 248/220.21 |
| 2012/0280094 A1 * | 11/2012 | Post | A47G 25/0614 | 248/205.2 |
| 2013/0093203 A1 * | 4/2013 | Burkhardt | B60P 3/40 | 296/3 |
| 2013/0320180 A1 * | 12/2013 | Castellanos | F16M 13/02 | 248/534 |
| 2014/0001328 A1 * | 1/2014 | Chung | F16M 13/02 | 248/231.91 |
| 2014/0097222 A1 * | 4/2014 | Robinson | B60R 7/14 | 224/401 |
| 2015/0023760 A1 * | 1/2015 | Bove, III | F16B 13/002 | 411/383 |
| 2015/0197259 A1 * | 7/2015 | Miner | F16L 3/003 | 248/75 |
| 2015/0219275 A1 * | 8/2015 | Grant | B60R 9/12 | 248/314 |
| 2015/0251607 A1 * | 9/2015 | Sautter, Jr. | B60R 5/04 | 224/548 |
| 2016/0029799 A1 * | 2/2016 | Hickman | A47B 97/04 | 248/447 |
| 2017/0164770 A1 * | 6/2017 | Fogg | A47G 25/62 | |
| 2017/0203699 A1 * | 7/2017 | Williams | B60R 9/06 | |
| 2017/0267186 A1 * | 9/2017 | Lachance | B60R 9/06 | |
| 2017/0356245 A1 * | 12/2017 | Surdo | E06C 7/488 | |

* cited by examiner

MOUNTING BRACKET AND METHOD OF USE

CROSS-REFERENCE TO RELATED APPLICATION

This application claims priority in U.S. Provisional Patent Application No. 62/496,342, filed Oct. 15, 2016, which is incorporated herein by reference.

BACKGROUND OF THE INVENTION

1. Field of the Invention

The present invention relates generally to a mounting bracket and method for use thereof, and more specifically to a mounting bracket especially for mounting and stacking ladders against a wall structure.

2. Description of the Related Art

When storing large items, such as ladders, finding space and securing the items can be difficult. Rods, hooks, and generally leaning objects, such as ladders, against walls are widely used. Rods which store multiple ladders tend to protrude dangerously into the working or living environment.

Hooks can only accommodate a single ladder at a time. When multiple ladders are being stored, valuable wall space is used up preventing the storage of other items.

Standing ladders on the floor and leaning them against the wall similarly wastes space, causes the ladders to be in the way, collect dirt and debris about their feet, and must be moved to clean around them. Further, these ladders may fall over, damaging objects or persons.

What is needed is a system and method for storing multiple ladders or other large objects against a wall structure while removing the item from the floor, freeing up useful space, while ensuring a secure storage solution.

Heretofore there has not been available a system or method for a mounting bracket system with the advantages and features of the present invention.

BRIEF SUMMARY OF THE INVENTION

The present invention generally provides a mounting bracket for storing large items, such as ladders, off of the ground and on a wall structure. The bracket can store up to three ladders or similar items using a pair of mounting prongs forming a Y-bracket, and a pair of mounting hooks which can receive bungee cords for stretching and connecting around ladder rungs. The bracket can mount to a wall structure by inserting mounting screws through a pair of mounting holes and drilling the mounting screws into the wall or a wall stud.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Mounting Bracket System 2

Figure 1:
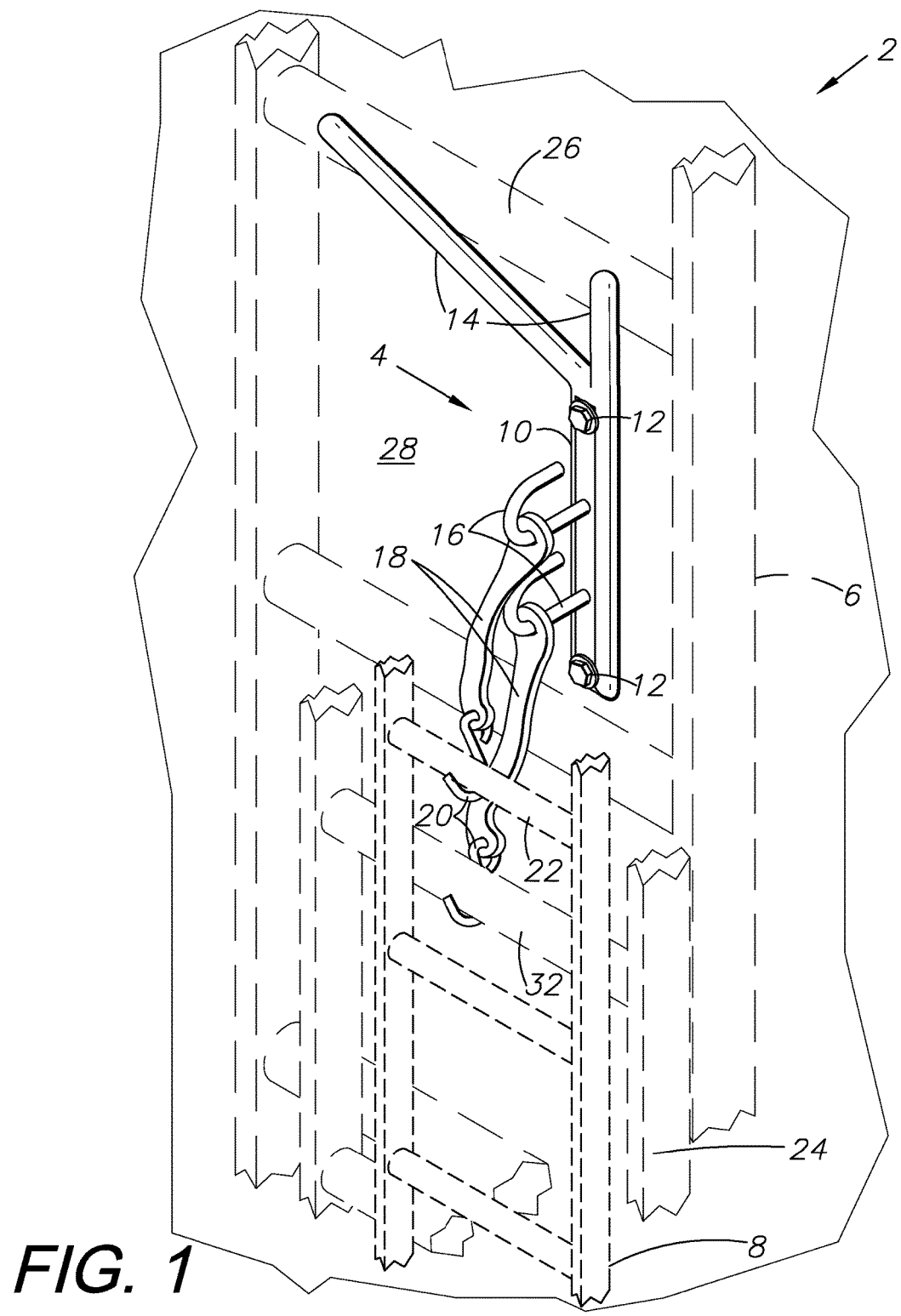
FIG. 1 is a three-dimensional isometric view of a preferred embodiment of the present invention shown in a preferred environment mounting three ladders.

FIG. 1 shows a preferred embodiment mounting bracket system 2 which has a mounting bracket 4 mounted to a wall 28 using a pair of mounting screws 12 through a vertical portion 10 storing a first ladder 6, a second ladder 8, and a third ladder 24. The mounting bracket 4 includes a pair of angled arms 14 14 stemming off of the vertical portion 10 forming a Y-bracket which are engaged with a rung 26 of the first ladder 6, thereby securing the first ladder 6 to the wall 28.

The mounting bracket 4 includes a pair of hooks 16 each of which are shown connecting to respective stretchable cord 18. Each stretchable cord 18 terminates into a hook 20. One hook 20 is connected to a rung 22 of a second ladder 8, thereby securing the second ladder 8 to the wall 28. The other hook 20 of the other cord 18 is connected to a rung 32 of a third ladder 24, thereby securing the third ladder 24 to the wall 28.

Figure 2:
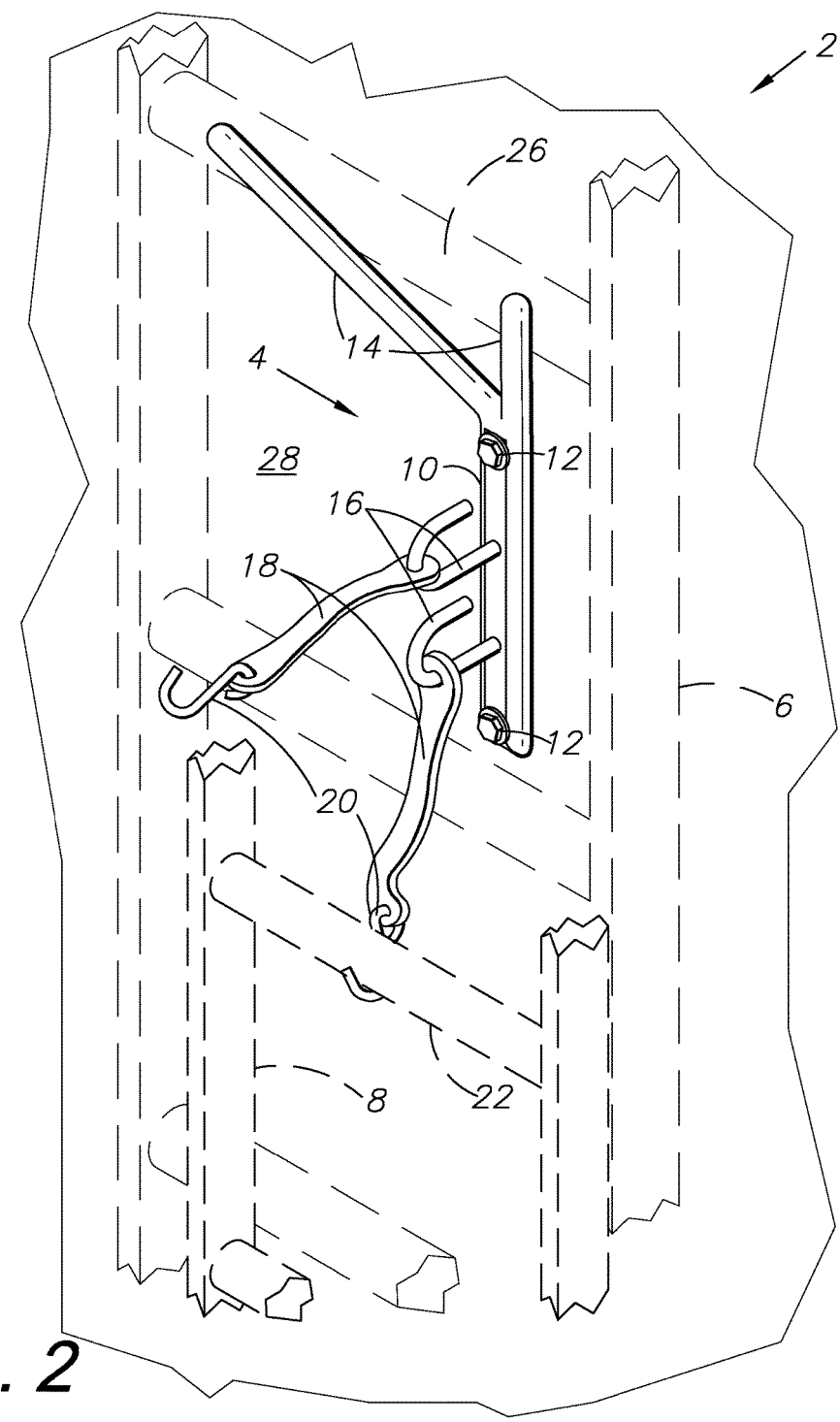
FIG. 2 is a three-dimensional isometric view of the embodiment thereof shown in an environment mounting two ladders.

FIG. 2 shows the mounting bracket 4 mounting a first ladder 6 and a second ladder 8 to the wall, with a free cord 18 and hook 20 for connecting to and storing another item.

Figure 3:
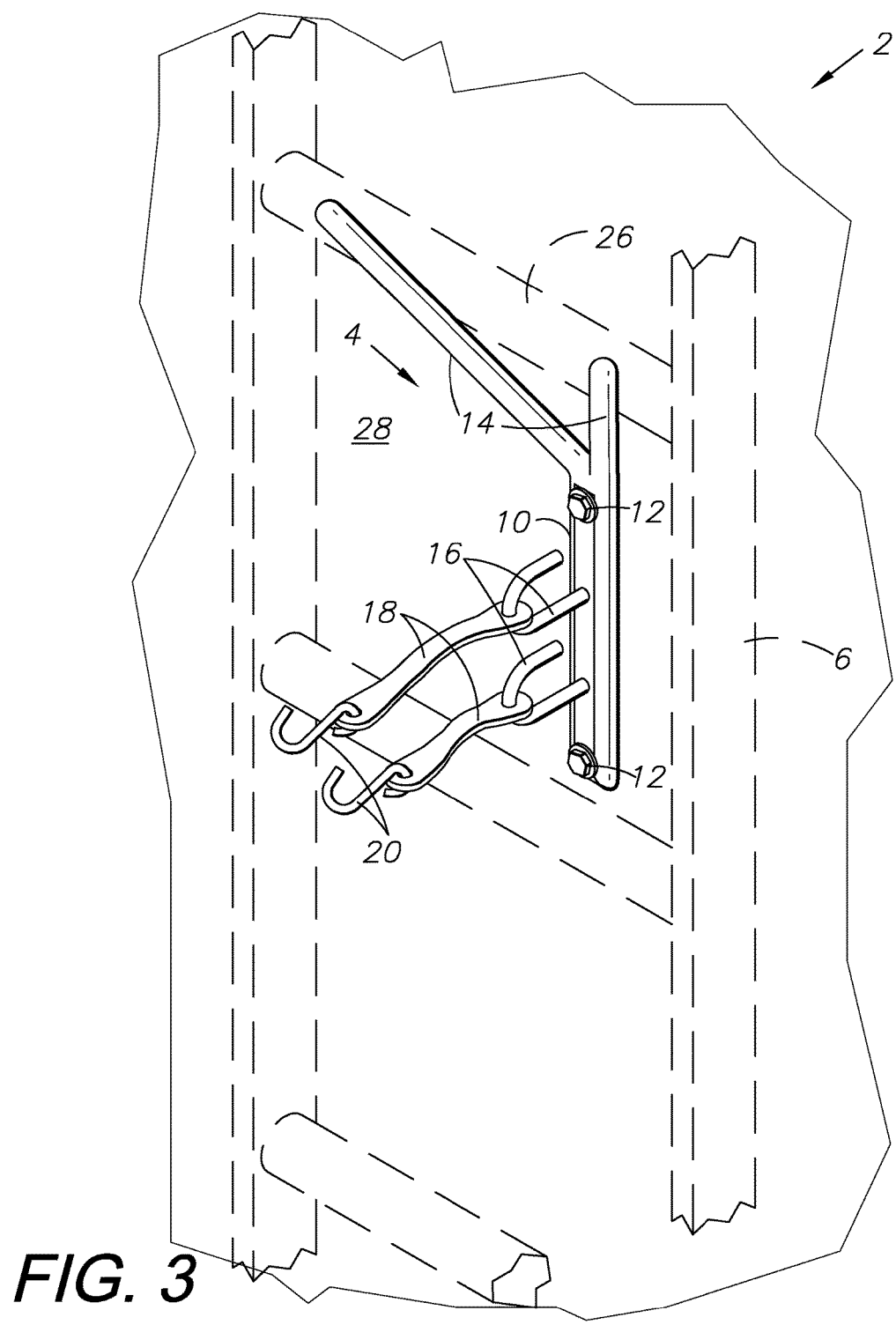
FIG. 3 is a three-dimensional isometric view of the embodiment thereof, shown in an environment mounting a single ladder.

FIG. 3 shows the mounting bracket 4 mounting a single ladder 6 using only the upper arms 14 forming the Y-bracket. The two flexible cords 18 are free to connect to and store additional items.

Figure 4:
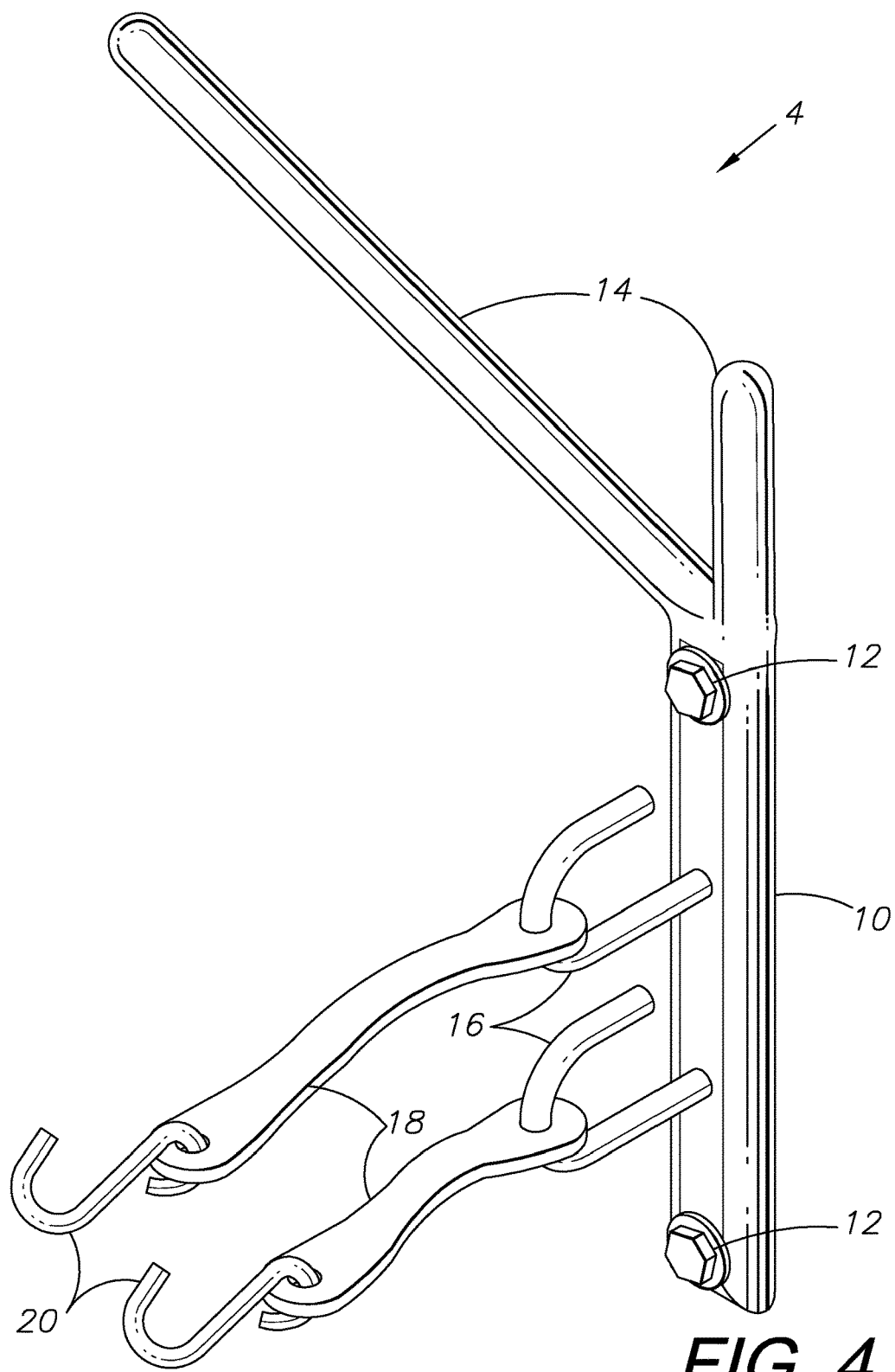
FIG. 4 is a three-dimensional isometric view of a mounting bracket element thereof including a pair of bungee cords.
Figure 5:
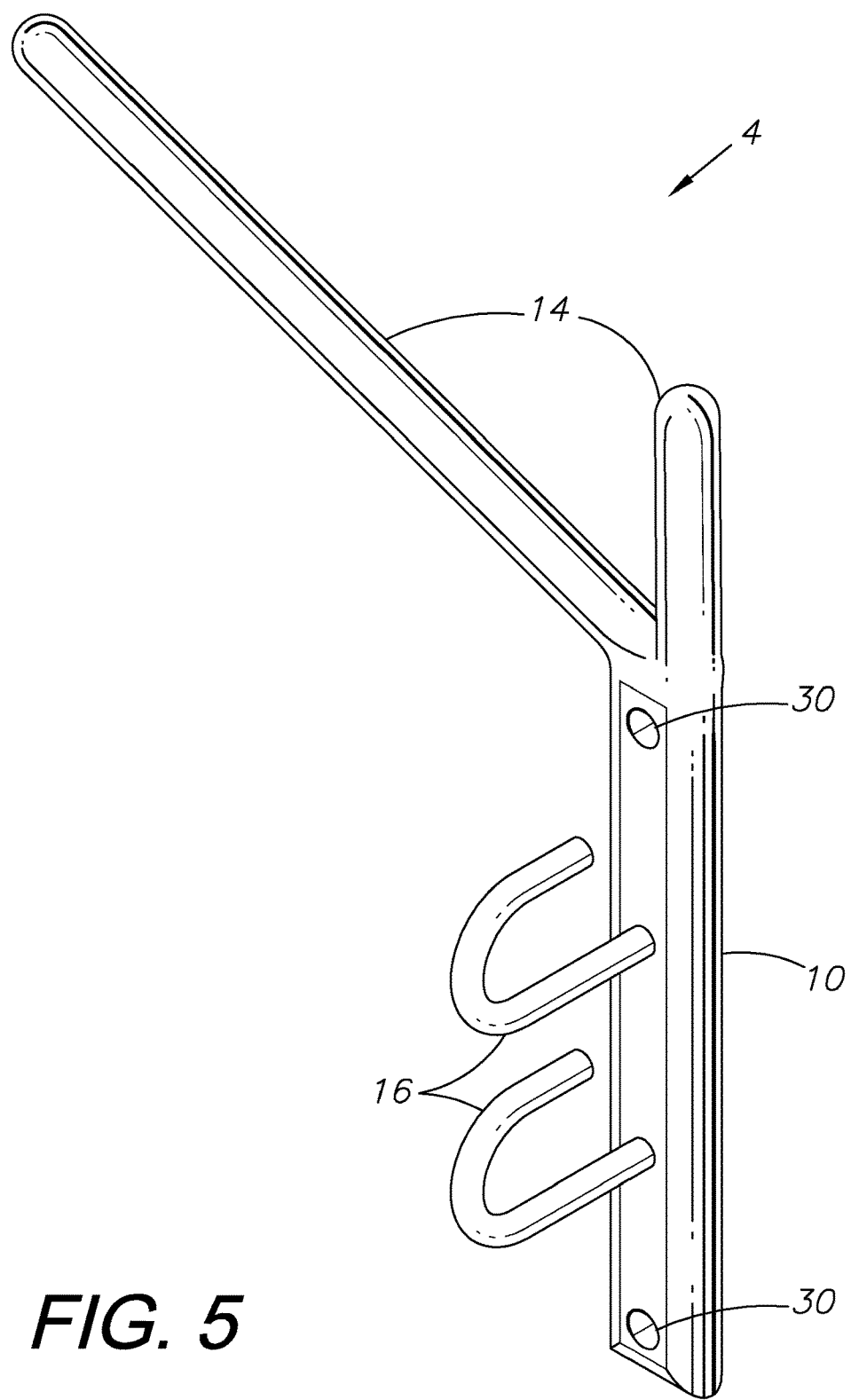
FIG. 5 is a three-dimensional isometric view of the mounting bracket thereof in isolation.
Figure 6:
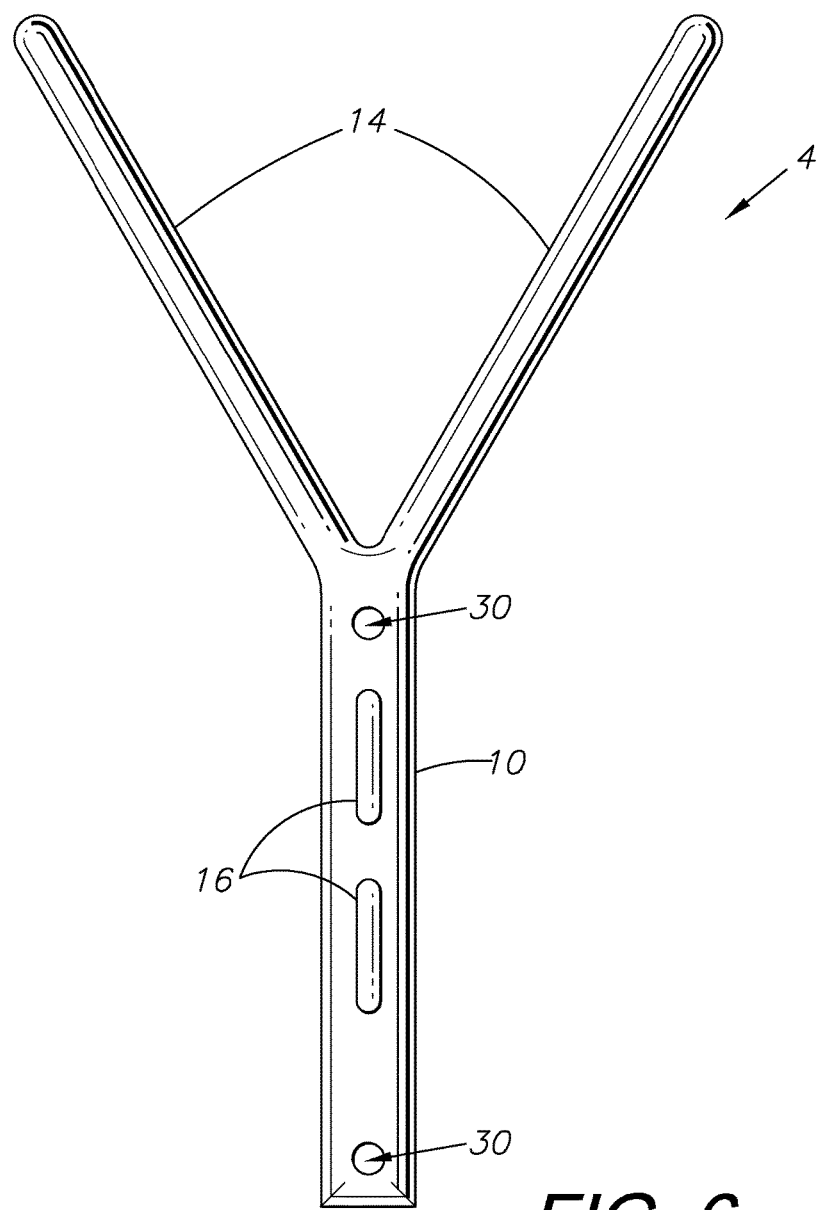
FIG. 6 is a front elevational view thereof.
Figure 7:
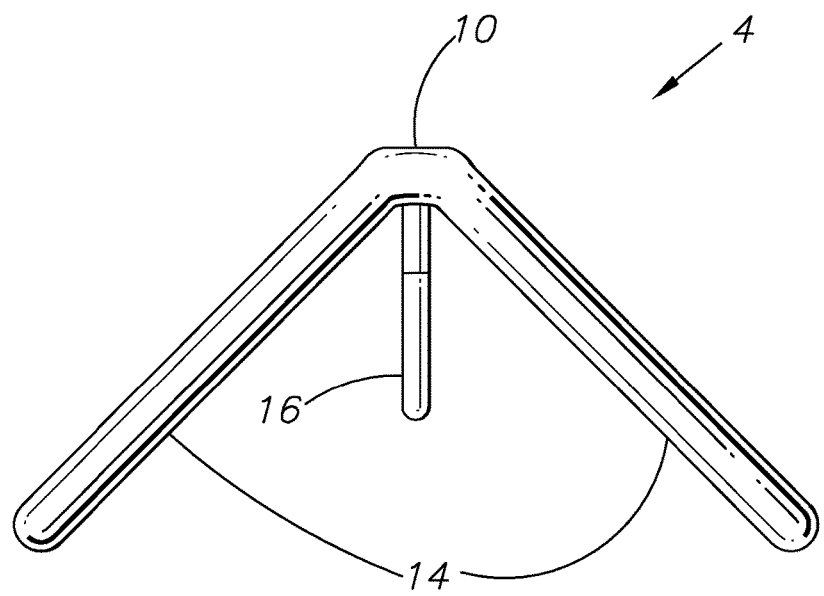
FIG. 7 is a top plan view thereof.
Figure 8:
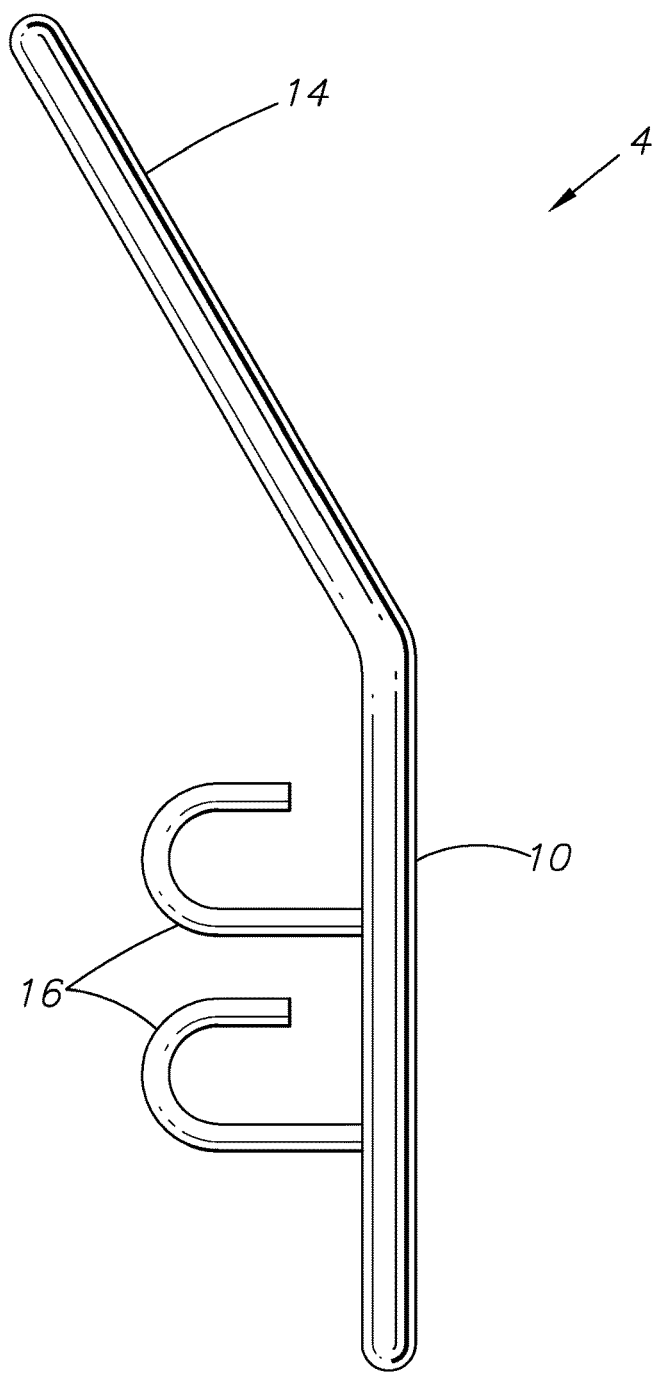
FIG. 8 is a side elevational view thereof.

FIG. 4 shows the mounting bracket 4 including the stretchable cords 18 terminating into hooks 20 and the mounting screws 12. FIG. 5 shows the mounting bracket in isolation and shows the receiver holes 30 for receiving the mounting screws 12 when securing the bracket 4 to the wall 28. FIGS. 6-8 show additional views thereof.

When using the mounting bracket system 2, the user would locate a stud in a wall or a suitable mounting location. The tallest ladder to be mounted should be measured to determine from what rung the ladder will be hung from such that the ladder just rests above the ground. The correct measurements are made and the bracket 4 is mounted to the stud or wall 28 using the mounting screws 12 through the mounting hole receivers 30.

The first ladder 6 will be hung from the angled arms 14 which form the Y-bracket. The second 8 and third 24 ladders can then be hung from their respective rungs 22, 32 using the connected stretchable bands 18 and hooks 20.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mounting system comprising:
    a mounting bracket configured for mounting to a wall, said mounting bracket comprising a vertical portion having a front face, a rear face, a top end, and a bottom end, said top end of said vertical portion terminating into a pair of angled arms, thereby forming a Y-shaped bracket, each one of said pair of angled arms extending outwardly and upwardly at an angle away from said vertical portion and from said wall thereby creating a storage space;
    a first receiver hole passing through said vertical portion in proximity with said top end and a second receiver hole passing through said vertical portion in proximity with said bottom end, said first and second receiver holes configured to receive mounting connectors for affixing said mounting bracket to said wall;
    at least one hook affixed to said front face of said vertical portion, said hook connecting with a band;
    a first ladder connected to said mounting bracket storage space via said pair of angled arms such that said angled arms bias said first ladder against said wall, thereby preventing said first ladder from sliding away from said vertical portion of said mounting bracket; and
    a second ladder connected to said mounting bracket and mounted to said mounting bracket via said band such that said band passes over a portion of said first ladder, thereby pinning said first ladder against said wall with said second ladder and said band.

2. The mounting system of claim 1, wherein said first ladder includes at least one rung and said pair of angled arms is configured for receiving said one rung.

3. The mounting system of claim 2, wherein said second ladder includes a second rung, and said band is configured for receiving said second rung.

4. The mounting system of claim 1, further comprising:
    said band comprising a stretchable material; and
    said band terminating in an end hook configured to hook to said second rung directly.

5. The mounting system of claim 1, further comprising:
    a second band connected to a second hook affixed to the front face of said vertical portion; and
    a third ladder connected to said mounting bracket via said second band.

6. The mounting system of claim 5, wherein said third ladder includes a third rung and said second band is configured for receiving said third rung.

7. A ladder mounting system comprising:
    a mounting bracket configured for mounting to a wall, said mounting bracket comprising a vertical portion having a front face, a rear face, a top end, and a bottom end, said top end of said vertical portion terminating into a pair of angled arms, thereby forming a Y-shaped bracket, each one of said pair of angled arms extending outwardly and upwardly at an angle away from said vertical portion and from said wall;
    a first receiver hole passing through said vertical portion in proximity with said top end and a second receiver hole passing through said vertical portion in proximity with said bottom end, said first and second receiver holes configured to receive mounting connectors for affixing said mounting bracket to said wall;
    a first hook affixed to said front face of said vertical portion, said hook connecting with a first band terminating in a first band hook;
    a second hook affixed to said front face of said vertical portion, said hook connecting with a second band terminating in a second band hook;
    each of said first and second bands comprising a stretchable material;
    a first ladder comprising a first rung connected to said mounting bracket via said pair of angled arms configured to receive said rung such that said angled arms bias said first ladder against said wall, thereby preventing said first ladder from sliding away from said vertical portion of said mounting bracket;
    a second ladder connected to said mounting bracket via said first band hook hooked to a second ladder rung directly;
    a third ladder connected to said mounting bracket via said second band hook hooked to a third ladder rung directly;
    said first band configured to be looped over a rung of said first ladder, such that said first band passes over a portion of said first ladder, thereby pinning said first ladder against said wall with said second ladder and said first band; and
    wherein said second and third ladders are secured against said first ladder and said first, second, and third ladders are biased towards and against said wall.

* * * * *